United States Patent
Hsai

(10) Patent No.: US 7,204,508 B1
(45) Date of Patent: Apr. 17, 2007

(54) TRAILER LOCK

(75) Inventor: Chin-Hui Hsai, Chang Hua (TW)

(73) Assignee: Handyway Co., Ltd., Chang Hua (TW)

( * ) Notice: Subject to any disclaimer, the term of this patent is extended or adjusted under 35 U.S.C. 154(b) by 15 days.

(21) Appl. No.: 11/236,666

(22) Filed: Sep. 28, 2005

(51) Int. Cl.
*E05B 65/12* (2006.01)

(52) U.S. Cl. .......................... 280/507; 70/169; 70/258

(58) Field of Classification Search ................ 280/507, 280/511; 70/14, 57, 58, 169, 232, 258
See application file for complete search history.

(56) References Cited

U.S. PATENT DOCUMENTS

| | | | | |
|---|---|---|---|---|
| 3,526,110 A | * | 9/1970 | Foote | 70/258 |
| 3,780,546 A | * | 12/1973 | Longenecker | 70/58 |
| 4,581,908 A | * | 4/1986 | Bulle et al. | 70/58 |
| 5,515,947 A | * | 5/1996 | Shieh | 188/69 |
| 5,752,398 A | * | 5/1998 | Villalon, Jr. | 70/58 |
| 6,393,874 B1 | * | 5/2002 | Zapushek et al. | 70/14 |
| 2006/0033309 A1 | * | 2/2006 | Pare | 280/507 |
| 2006/0163842 A1 | * | 7/2006 | Jacques | 280/507 |

* cited by examiner

*Primary Examiner*—Anne Marie Boehler
(74) *Attorney, Agent, or Firm*—Troxell Law Office, PLLC

(57) ABSTRACT

A trailer lock and particularly a trailer lock for locking a trailer ball cap includes a lock housing, a lock, a latch bolt, a holding seat and a detent member. The lock housing has an opening to hold the lock, a U-shaped trough to hold the latch bolt, a through trough to hold the holding seat and allow the detent member to slide on the holding seat. The lock has a housing chamber on one side to couple with the trailer ball cap. The latch bolt can control movement of the detent member by turning of the lock so that the detent member is wedged in a latch trough on one end of the latch bolt, and a latch end of the latch bolt is extended and anchored in the housing chamber of the lock housing and locked on the trailer ball cap. When the trailer is separated from a vehicle, the trailer ball cannot be coupled thereby to provide theft-proof function.

5 Claims, 6 Drawing Sheets

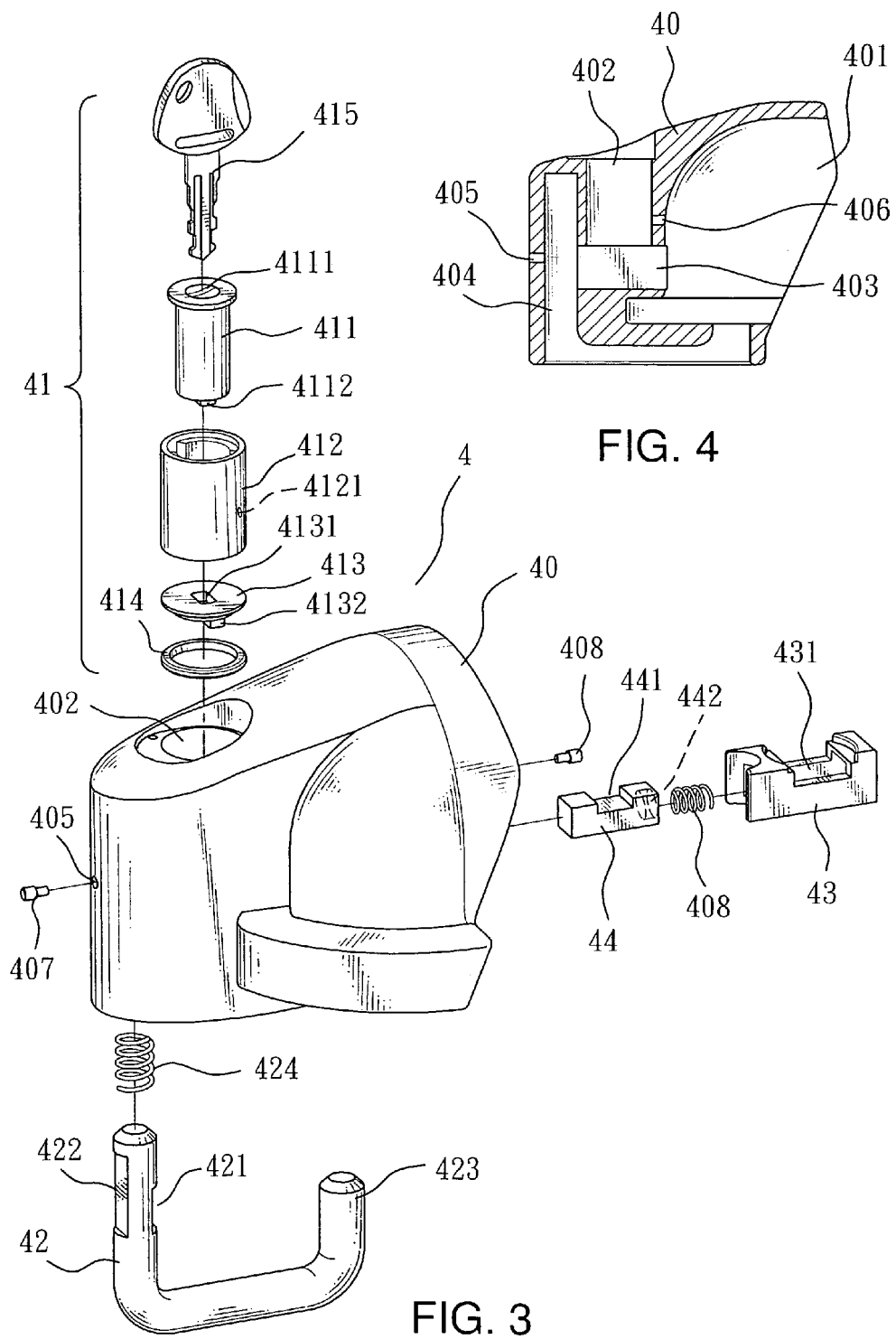

TRAILER LOCK

BACKGROUND OF THE INVENTION

1. Field of the Invention

The invention relates to a trailer lock and particularly to a trailer lock for locking a trailer ball cap.

2. Description of the Prior Art

Referring to FIG. 1, a conventional camping vehicle 1 and a trailer 2 usually are coupled through a coupling apparatus 3. The coupling apparatus 3 includes a trailer ball 31 on a rear side of the vehicle 1 and a trailer ball cap 32 on one end of the trailer 2. The trailer ball cap 32 can be coupled with the trailer ball 31 to connect the vehicle 1 and the trailer 2 for hauling. However, when the trailer is not coupled with the vehicle, any vehicle equipped with a trailer ball can haul the trailer away. As a result, the trailer is easily stolen. This is an issue troubling many trailer owners.

SUMMARY OF THE INVENTION

In view of the aforesaid problem, the present invention aims to provide a compact and easy to use trailer lock to protect the trailer from being stolen. It mainly includes a lock housing, a lock, a latch bolt, a holding seat and a detent member. The lock housing has an opening to hold the lock, a U-shaped trough to hold the latch bolt, a through trough to hold the holding seat and allow the detent member to slide in a trough of the holding seat. The lock has a housing chamber on one side to couple with a trailer ball cap. The latch bolt can control movement of the detent member by turning of the lock so that the detent member can be wedged in a latch trough on one end of the latch bolt, and the latch end of the latch bolt can be extended and anchored in the housing chamber of the lock housing and lock the trailer ball cap. Thereby it can prevent coupling of any trailer ball to protect the trailer from being stolen.

The invention is simply structured and easy to use. It is compact and convenient to carry, and can provide effective theft-proof function to protect users from loss.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3 is an exploded view of the invention.

FIG. 4 is a fragmentary sectional view of the lock housing of the invention.

DESCRIPTION OF THE PREFERRED EMBODIMENT

Figure 1:
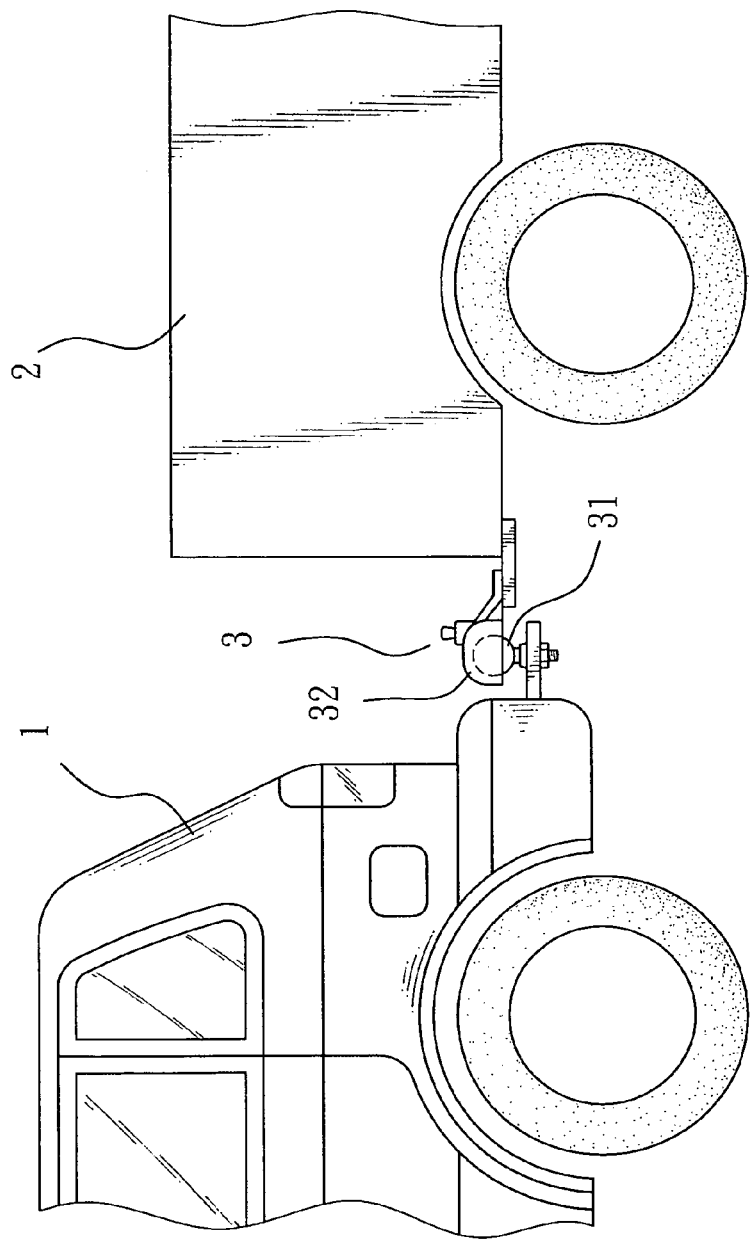
FIG. 1 is a schematic view of a conventional means for coupling a vehicle and a trailer.
Figure 2:
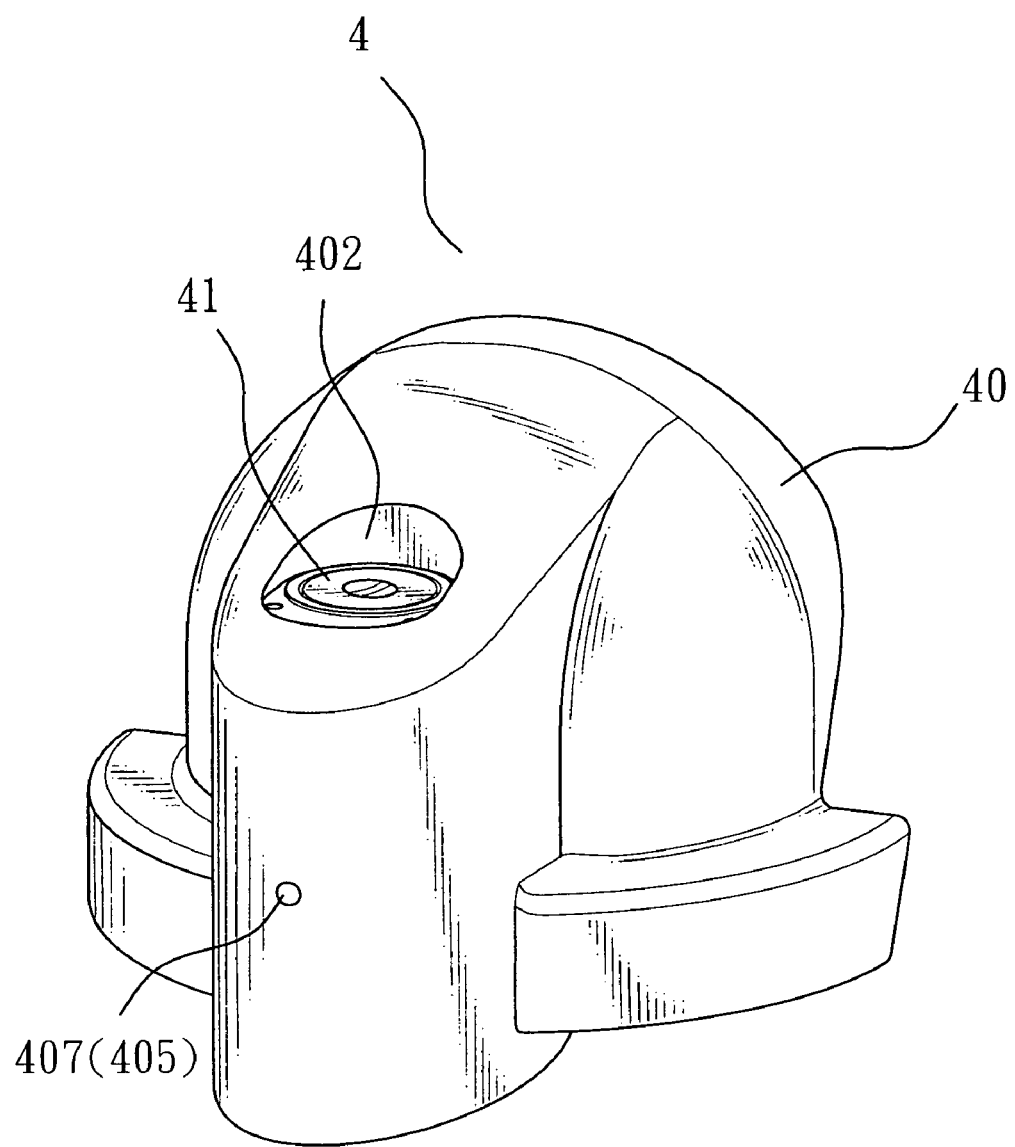
FIG. 2 is a perspective view of the invention.

Referring to FIGS. 2, 3 and 4, the invention includes a lock housing 40, a lock 41, a latch bolt 42, a holding seat 43 and a detent member 44.

The lock housing 40 is to couple with a trailer ball cap 5. It has a housing chamber 401 on one side. The housing chamber 401 has a through trough 403 on one side with one end communicating with a U-shaped trough 404. The U-shaped trough 404 has a detent hole 405 on one side to receive a pin 407, and another end leading to the housing chamber 401. The through trough 403 communicates with an opening 402 on a upper side which is leading to the exterior. One side of the opening has an aperture 406 to receive another pin 408.

The lock 41 includes a core 411, a sleeve 412, a driving member 413, a coupling ring 414 and a key 415. The lock 41 is held in the opening 402. The core 411 is housed in the coupling sleeve 412 and has a key way 4111 on a upper side to receive the key 415 for turning. Thereby a latch tongue 4112 on the bottom of the core can be driven. The coupling sleeve 412 has an anchor hole 4121 on one side to receive the another pin 408 for anchoring. The coupling sleeve is coupled with the driving member 413 on the bottom. The driving member 413 has a cavity 4131 to be coupled with the latch tongue 4112 for moving together. The driving member further has an eccentric control lump 4132 on the bottom, and is coupled with the coupling ring 414 on a lower side.

The latch bolt 42 is located in the U-shaped trough 404 of the lock housing 40. It has a latch trough 421 on one side and a detent trough 422 on another side. The detent trough 422 is confined by the pin 407. The latch bolt 42 has one end coupled with a spring 424 so that it can be moved up and down in the U-shaped trough 404. The latch bolt 42 has a latch end 423 extendable into the housing chamber 401 of the lock housing 40.

The holding seat 43 is located in the through trough 403, and has a trough 431 on a upper side, and an opening on one end.

The detent member 44 is located in the trough 431 and slidable in the holding seat 43 with one end wedging in the latch trough 421 of the latch bolt 42 to control upward and downward movements of the latch bolt. The detent member 44 further has a notch 441 on a upper side and a cavity 442 on one end to couple with another spring 443. The notch 441 aims to latch the control lump 4132 thereby to control forward and backward movements of the detent member 44.

Figure 5:
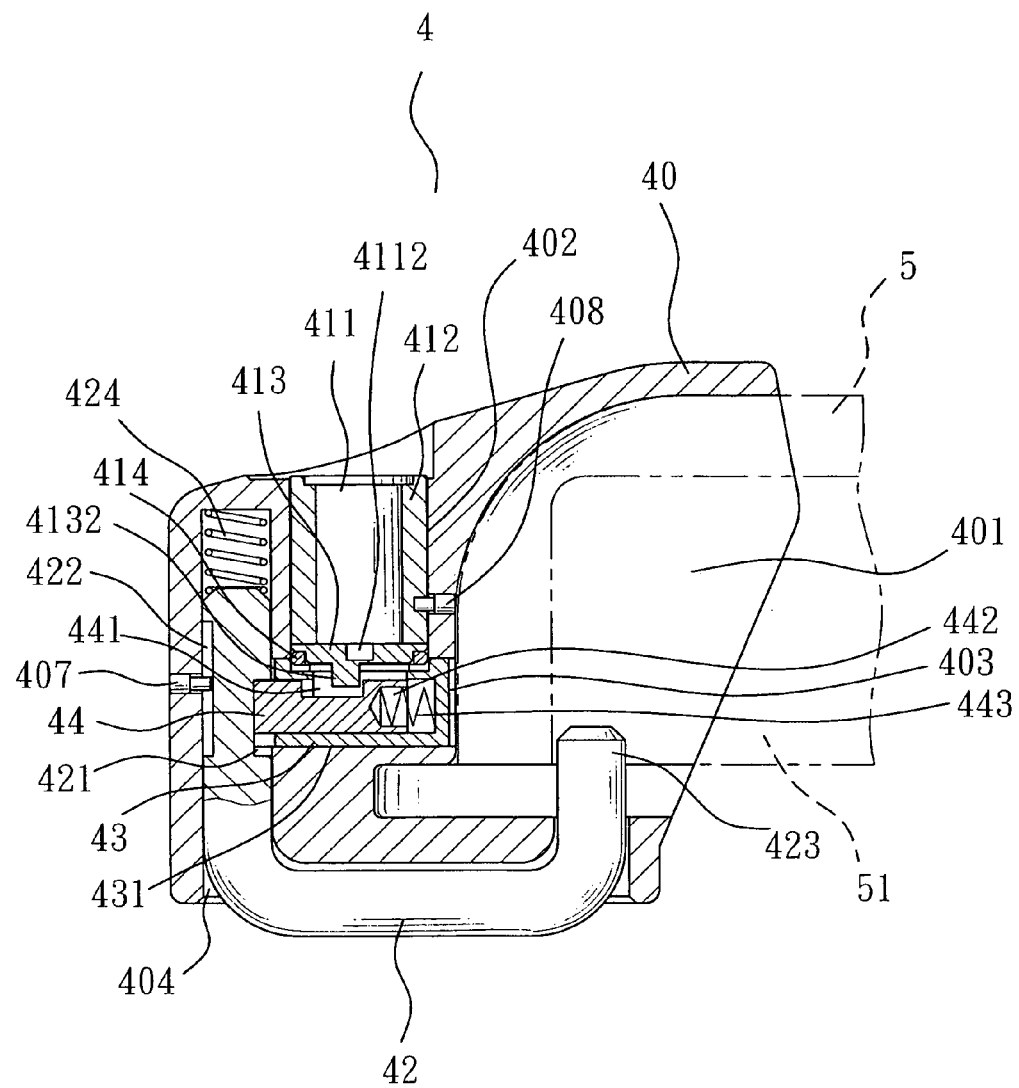
FIG. 5 is a schematic view of the invention in an operating operation.
Figure 6:
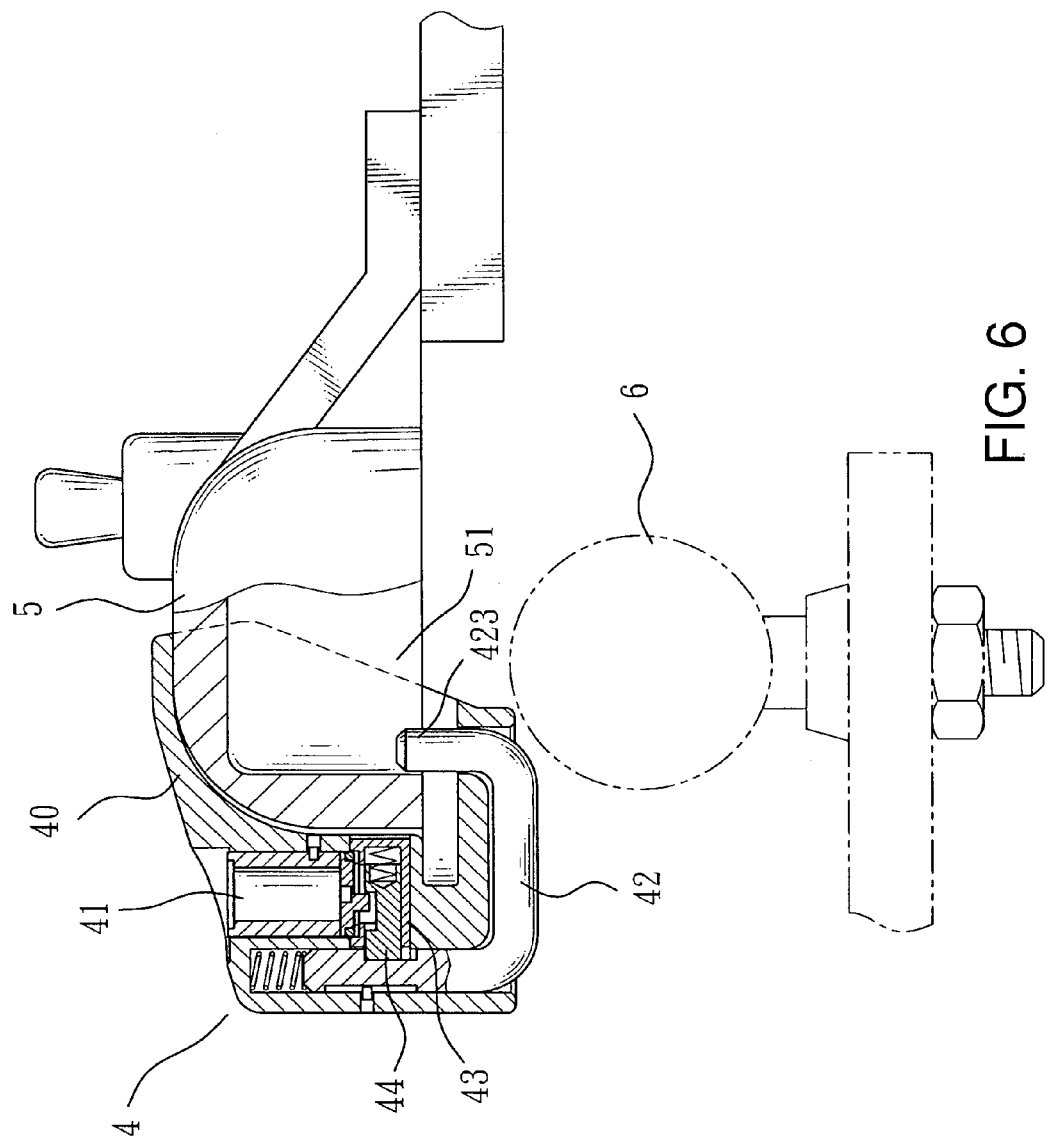
FIG. 6 is a schematic view of an embodiment of the invention.
Figure 7:
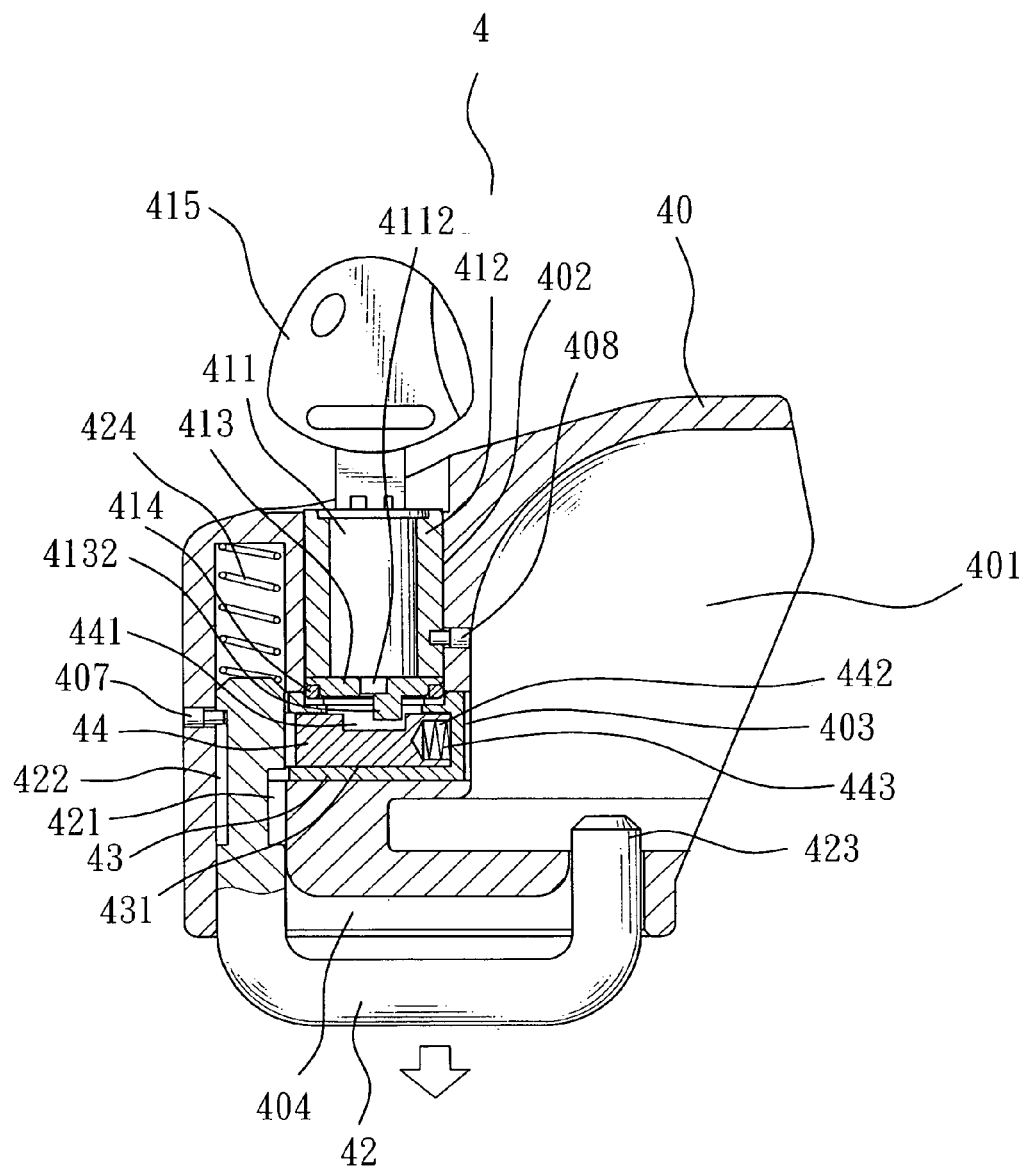
FIG. 7 is a schematic view of the invention in another operating operation.

Referring to FIG. 5, when in use for locking, first, couple the trailer lock 4 on the trailer ball cap 5, with the housing chamber 401 holding the trailer ball cap 5; turn the lock 41 to a locking condition; the control lump 4132 is driven by the latch tongue 4112 and moved; the detent member 44 is pushed by the another spring 443 and moved forwards, and one end of the detent member is wedged in the latch trough 421 of the latch bolt 42; the latch end 423 of the latch bolt 42 is extended into a spherical trough 51 of the trailer ball cap 51. Therefore the trailer lock 4 is anchored on the trailer ball cap 5 to form a locking condition. The spherical trough 51 is hindered by the lock housing 40 so that a trailer ball 6 cannot be held in the spherical trough 51. Thus a theft-proof function can be achieved (referring to FIG. 6). On the contrary, for unlocking, referring to FIG. 7, the lock 41 is turned to a unlocking condition; the control lump 4132 drives the detent member 44 rearwards; one end of the detent member 44 escapes the latch trough 421; the latch bolt 42 is pushed by the spring 424 and moved downwards; the latch end 423 formerly extended into the trailer ball cap 5 escapes from the spherical trough 51; as a result, the trailer lock 4 can be removed from the trailer ball cap 5 to finish the unlocking operation.

Based on previous discussion, it can be seen that the structure of the invention is simple. Operation is easy. The size is small and convenient to carry. It can provide an effective theft-proof function.

I claim:

1. A trailer lock comprising a lock housing, a lock, a latch bolt, a holding seat and a detent member; wherein:

the lock housing has a housing chamber to hold a trailer ball cap, the housing chamber having a through trough on one side that has one end communicating with a U-shaped trough, the U-shaped trough having another end leading to the housing chamber, the through trough having an opening on a upper side to hold the lock;

the lock is held in the opening of the lock housing, and has a core which has a key way on a upper side to receive a key for turning to move a latch tongue and a driving member;

the latch bolt is located in the U-shaped trough and has a latch trough on one end which is coupled with a spring to move the latch bolt upwards and downwards in the U-shaped trough, and a latch end extendable into the housing chamber of the lock housing;

the holding seat is located in the through trough of the lock housing and has a trough on a upper side and an opening on one end;

the detent member is located in the trough of the holding seat and slidable on the holding seat, and has one end wedging in the latch trough of the latch bolt to control upward and downward movements of the latch bolt, and a notch on a upper side to confine the driving member, and a cavity on one end to hold another spring to control forward and backward movements of the detent member.

2. The trailer lock of claim 1, wherein the latch bolt has a detent trough on the one end to receive a pin which runs through the lock housing to anchor the latch bolt.

3. The trailer lock of claim 1, wherein the lock is coupled with a coupling ring on the bottom thereof.

4. The trailer lock of claim 1, wherein the driving member has a cavity.

5. The trailer lock of claim 1, wherein the driving member has an eccentric control lump on the bottom thereof.

* * * * *